May 18, 1943. H. T. WELP 2,319,484
BRAKE BEAM HEAD
Filed Oct. 14, 1939
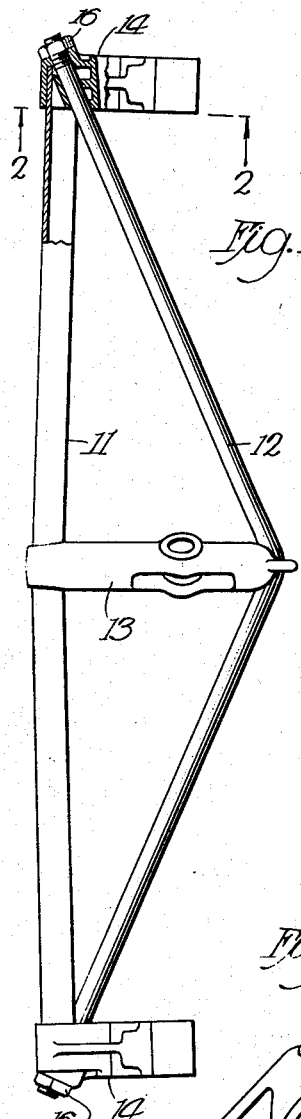
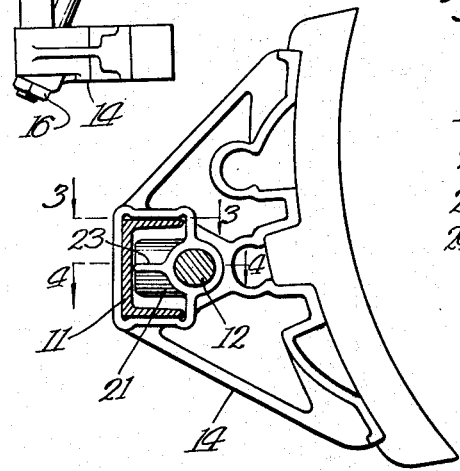
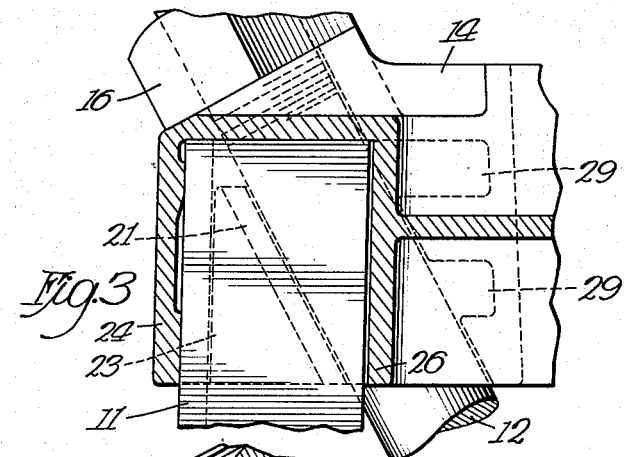
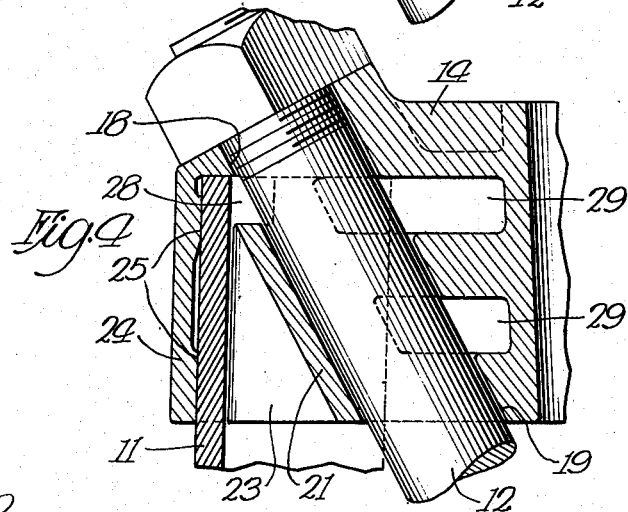
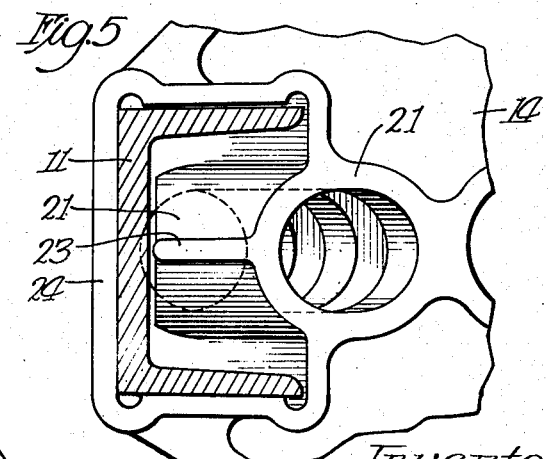
Inventor:
Herman T. Welp
By Mann, Brown & Coe
Attys.

Patented May 18, 1943

2,319,484

UNITED STATES PATENT OFFICE 2,319,484

BRAKE BEAM HEAD

Herman T. Welp, Chicago, Ill., assignor, by mesne assignments, to Chicago Railway Equipment Company, Chicago, Ill., a corporation of Illinois Application October 14, 1939, Serial No. 299,447

5 Claims. (Cl. 188—226)

A great deal of trouble has been encountered with brake beams heretofore, especially in connection with wear occurring between the tension member of the brake beam and the brake head. To avoid the necessity of expensive machining of the parts it is necessary for the brake head to have a breathing connection with the brake beam. Such lack of tightness, together with the great forces present in applying the brakes, causes a great deal of wear. Sometimes the wear is so severe that the tension member of the beam is greatly weakened and breaks under conditions of severe strain when the braking power is most needed.

Attempts to overcome this difficulty heretofore have involved expensive constructions which were commercially impractical for ordinary gear, especially that used on freight cars.

According to the present invention, the problem is solved by the very simple and inexpensive expedient of casting the brake head with an integral sleeve which forms elongated bearing surfaces for distributing the load in the zones where the greatest wear heretofore occurred, and by providing an extension or rib on the sleeve which tends to limit the wear by bearing on the compression member of the beam instead of letting the entire wear take place on the tension member. In this manner the wear is substantially reduced even though the parts are loose enough to provide the manufacturing tolerances necessary to avoid machining.

Additional advantages and objects of the invention will be apparent from the following description and from the drawing, in which:

Fig. 1 is a plan view of a brake beam and brake assembly with part of the brake beam and brake head broken away in section for the purpose of clarity.

Fig. 2 is a sectional view taken approximately on the line 2—2 of Fig. 1, showing an elevation of the brake head.

Fig. 3 is an enlarged fragmentary sectional view taken approximately on the line 3—3 of Fig. 2.

Fig. 4 is a corresponding view taken approximately on the line 4—4 of Fig. 2.

Fig. 5 is a fragmentary view similar to a portion of Fig. 2 but on an enlarged scale.

A preferred embodiment of the invention has been shown in the drawing and will hereinafter be described, all as required by section 4888 of the Revised Statutes, but the invention may take numerous forms, and the appended claims are not to be limited by the disclosure except as the prior art may require.

The invention is illustrated in conjunction with a brake beam which includes a compression member 11, tension member 12, and a connecting and operating strut or fulcrum 13. Each end of the compression member 11 extends into a recess in brake head 14 and the adjacent end of the tension member 12 extends through the brake head 14 and has a nut 16 tightened thereon. Tightening the nut 16 will place the tension member 12 under any desired degree of normal tension, after which the ends of the tension members may be riveted over to prevent the nuts 16 from loosening. Except for the new brake head 14, the brake beam is a conventional A. A. R. brake beam.

In the interests of economy it is very desirable that these parts should not need to be extensively machined in order to fit together. It is the commercial practice to make them with $\frac{1}{16}$ inch tolerance and they are designed to fit together in spite of this tolerance. It is apparent, therefore, that they will usually fit rather loosely. The looseness does have an apparent advantage in permitting a breathing action in that the brake head may twist inwardly or outwardly with respect to the brake beam so as to enable the face of the brake shoe to lie flat on the wheel in spite of distortional movements of the brake beam under stress. This same twisting or breathing action, however, aggravates the wear between the brake head and the tension member 12.

Referring to Fig. 4, it has usually been found that excessive wear takes place at the points 18 and 19 due to the particular way in which the brake beam is distorted by the forces present when applying the brakes. The present invention is, therefore, designed primarily to reduce the wear at these points. It will be observed that with continual wear at the point 19, the diameter of the tension member 12 will be reduced at that point so that under the terrific strain present during the application of the brakes, the tension member or rod 12 will sometimes break.

According to the present invention, applicant has overcome this difficulty of concentrated and excessive wear largely through the inexpensive provision of a sleeve 21 cast integrally with the brake head 14. This sleeve extends along the tension rod 12 for substantially the full width of the brake head 14 so that the bearing surface is incomparably increased. One might suppose that with the looseness necessary to avoid machining, and the consequent twisting of the head on the tension rod 12 this increased bearing surface would not bear on the rod and hence would have no effect. However, as soon as a slight amount of wear occurs at the corner 19 for example, the bearing surface will shift slightly toward the center of the brake head 14 and no further wear can occur at the point 19 until the bearing surface along a considerable portion of the sleeve has worn somewhat.

It would seem that if part of the wear could be diverted from the tension rod 12 to some other point, further reduction and depreciation due to this wear could be accomplished. It is not practicable, however, to have a tight fit between the brake head 14 and the compression member 11 because machined fitting would be even more expensive between the cast head and the channel-shaped compression member 11 than between the head and the round tension member 12. According to the present invention, however, a rib 23 is provided on the sleeve 21 and extends just close enough to the back wall 24 of the head 14 so that there will be adequate tolerance when the brake head is slid onto the compression member 11. In spite of this tolerance, the rib 23 will lie close to or even bear against the compression member 11, when wear takes place at the point 19, thereby tending to prevent further wear at the point 19. In short, the rib 23 and the opposing surfaces 25 on the back wall 24 will tend to limit the inward twisting of the brake head with respect to the beam.

As seen from Fig. 5, the rib 23 may be quite narrow with the result that it requires very little metal and adds very little weight to the brake head. Furthermore, in the event that it should obstruct the application of the brake head to the compression member, it is thin enough so that it can be thinned down with ease. In addition to serving the function of furnishing an additional bearing point, the rib 23 stiffens the sleeve 21. Nevertheless, the rib is in the nature of an extra brace which may be omitted without affecting the other novel features of the head.

Although the sleeve 21 is substantially continuous, a hole 28 may be provided therein to serve as a core support and also to make room for the insertion of the compression member 11 all the way into the brake head 14. Likewise, for the purpose of lightening the brake head and providing better cooling thereof, metal may be omitted to form the wells 29.

From the foregoing it is seen that a brake head is provided which, although made inexpensively and without machining, cooperates with the brake beam in a manner which greatly reduces wear on the parts and tends to prevent the continuation of the wear to the stage where breakage would occur. This is accomplished in spite of the looseness which, though necessary for manufacturing tolerances, permits the brake head to twist so that large bearing surfaces would have been considered useless inasmuch as only the edges of the surfaces would initially contact when the parts were twisted.

I claim:

1. A brake beam including a compression member, a brake head on the end of the compression member, and a tension member extending through the brake head and drawing it tightly onto the compression member, the brake head fitting the compression and tension members loosely and having a sleeve integrally cast therewith and extending from the side of the brake head toward the main length of the tension member substantially through the brake head to form an elongated bearing surface for the brake head on the tension member, and a rib extending from the sleeve approximately to the compression member and tending to limit the twisting of the brake head with respect to the tension member.

2. A brake head for a truss type brake beam, the head having a recess extending inwardly from one side of the head for receiving the end portion of a beam compression member and formed in part by the back wall of the head, there being a sleeve cast integrally with the head and extending from said side substantially through the head to form an elongated bearing surface for the head on a beam tension member, and a rib extending from the sleeve approximately to said back wall and tending to limit the movement of said sleeve and the tension member therein towards said back wall and a compression member bearing against the same.

3. In a railway truss type brake beam, a compression member, a tension member, a brake head having a recess, extending inwardly from one side of the head and receiving the end of the compression member, and having a sleeve extending inwardly from said side and forming an extended bearing for the tension member, the outer periphery of the sleeve being spaced substantially from the back of said recess, and a rib on said sleeve extending therefrom into opposition to the compression member so as to hold the latter and the tension member against movement towards each other under braking load.

4. A brake head for a truss type brake beam, the head having a recess extending inwardly from one side of the head for receiving the end portion of the beam compression member and having a sleeve extending inwardly from said side and forming an extended bearing for the beam tension member, the outer periphery of the sleeve being spaced substantially from the back of said recess, and a rib on said sleeve extending therefrom approximately to the back of said recess and tending to limit the movement of said sleeve and a tension member therein towards the back of said recess and a compression member bearing against the same.

5. A brake head for a truss type brake beam, the head having a recess extending inwardly from one side of the head to receive a beam compression member, the back wall of the head forming one side of the recess, the head having an arcuate sleeve element extending inwardly from said side with its outer periphery spaced from said wall and with its inner periphery forming an elongated bearing for a beam tension member, a rib projecting from said sleeve element toward said wall and extending from end to end of the sleeve, the side of the sleeve opposite the rib having wells extending transversely of the sleeve axis and decreasing the mass of metal in the portion of the head in front of the sleeve and forming arcuate bearing elements spaced apart lengthwise of the sleeve.

HERMAN T. WELP.